Patented Mar. 28, 1950

2,501,995

UNITED STATES PATENT OFFICE 2,501,995

ACID RESISTANT MOLDING COMPOSITION AND BATTERY BOX

Edward R. Dillehay, Glen Ellyn, Ill., assignor to The Richardson Company, Lockland, Ohio, a corporation of Ohio No Drawing. Application November 9, 1946, Serial No. 708,925

22 Claims. (Cl. 260—28.5)

My invention relates to compositions for use in molding of such objects as storage battery cases using asphaltic material as the principal binder, together with mineral matter and fiber. Since acid resistant fiber of suitable strength for such composition is expensive and since cheaper acid resistant fiber of less strength would have to be employed in such a great quantity to attain sufficient strength, it is an important aspect of my composition that in use it will protect acid attackable fiber, for example organic fiber such as cotton linters.

In my application for Letters Patent Serial No. 562,514 filed October 19, 1942, I first disclosed certain aspects of my present invention and in application for Letters Patent Ser. 553,-465 filed September 9, 1944, I disclosed certain additional features of the same. Both of these applications are abandoned. The present application is a continuation in part of my former applications now identified.

In U. S. Letters Patent to Alan R. Lukens No. 1,752,917 is disclosed and claimed the so-called "composition" electric storage battery case and my present invention is a development over the said Lukens invention.

The Lukens patent embodied a composition of asphalt, acid resistant mineral matter and organic fiber in which the organic fiber was kept under 15% of the total mass. Storage battery cases made in accordance with the principles of the said patent have been employed industrially in large quantities for many years. The relatively low cost of production of the asphaltic composition box as compared to a box formed of vulcanized rubber and fillers has resulted in maintaining the popularity of the Lukens box even though it did not measure up to a vulcanized rubber box from the point of view of resistance to acid attack. Furthermore, the fact that the composition was molded hot and contained a fairly large amount of fiber, resulted in manufacturing problems to avoid knit lines in the finished product which would constitute a source of acid penetration into the composition.

According to my discoveries, if a resin having high acid resistance is added to the asphaltic substance forming the binder of a composition battery case little or no advantage is obtained, if the resin has been permitted to polymerize to close to its full extent before or while being incorporated into the asphaltic composition. Such a resin while it may be practically inert to acid, will simply exist in particle form in the asphaltic binder. If, however, an acid catalyzable resin is selected which, when completely cured is practically inert to acid attack (taking as a standard the normal acid of an electrolytic storage battery) and this resin is blended into the composition while in a stage short of its final polymerization, and while plastic enough to blend with the asphalt, then when subject to storage battery acid, as with the interior of a composition storage battery case or box molded from the composition, the surface contacted by the acid will develop a barrier to acid penetration.

Since there are limits in hardness of asphaltic binder which can be employed in making such objects as storage battery cases it has developed in connection with certain desirable resins that there is a severe limitation in amount of incompletely polymerized acid resistant resin which can be employed, since the resin is relatively soft prior to the final stages of polymerization and the use of any large quantity will render the final molded product too soft to be valuable for such an object as a storage battery case. It is not practical to go beyond a certain quantity of fiber in such a composition and to this may be added that it is not practical to go beyond a certain quantity of finely divided mineral matter. Thus it is not practical to vary extensively the mineral and fiber content in such a box, and thus to increase its stiffness and strength to compensate for more softness of binder because molding difficulties and mixing complications will interfere.

I have discovered that the amount of such a resin in proportion to asphalt which is required to be used to increase the resistance to acid of a molded composition is relatively small. A relatively small percent of acid-polymerizable resin distributed throughout the composition and existing in the molded article in an incompletely polymerized condition will protect the surfaces of a molded product against any appreciable penetration of acid into the fibrous structure of its composition. The phenomenon that can readily be observed is that upon contact of the molded surface with the acid, a surface barrier is built up, most perfectly when the polymerizing action on the resin portion of the binder is quite active, said barrier being practically impervious to acid.

It will be apparent from this surface phenomenon that the binder portion of the composition, except for the acid contacted surface does not appear to change substantially and whatever softening effect on the asphalt is imparted by the incompletely polymerized resin will remain a characteristic of the storage battery case. Thus the aging of the finished product does not change its hardness over a period which includes a good part of the battery life, at least, and the resin in the composition continues to impart whatever softening effect it may have. If the composition originally contained acid sufficient to polymerize the resin it would either render the resin inert before molding or would attack the fiber, or both.

With certain of the resins which remain soft to a point close to complete polymerization, the problem as to quantity to use is one of a balance between hardness of the binder itself and the required amount of the partially polymerized resin in the finished article. Thus with furfuryl alcohol resin, the requirement is for a hard asphaltic binder as compared to binders which would be satisfactory in the absence of the resin. With others of the resins such as those containing substantial amounts of the phenol family type, there is a heat hardening which takes place as a result of the heat of mixing and of hot molding so that the precaution in percentage used, except for economy is not required because of the necessity of maintaining the hardness of the molded composition. With this type of resin the precaution is rather to avoid so complete a polymerization, as a result of heat as to impair the phenomenon of the formation of the barrier upon exposure to battery acid.

For a storage battery composition the amount of binder of all kinds will have to be within 35 to 65% of the complete composition. The fibrous ingredient, if of cotton linters, should not run over say 17% of the composition and the mineral matter will constitute the difference, although this percentage can be exceeded with quite short fiber. For best mixing and molding technique, the binder should run to around 50% of the composition, the fiber to around 11 or 12%, and the balance finely divided acid resistant mineral matter. Where all of the fiber is acid resistant the present invention is not so important, but even when as much as 5% of the fiber is acid attackable, the invention is of great importance. The present invention is not concerned with modifications in general in the molding composition constituents.

The asphaltic substance used should not exceed a penetration of around 25 at 150° F. in 5 seconds under a weight of 100 grams (ASTM). It should not have a penetration as low as 5 under the same conditions. These limits might be exceeded somewhat, but would introduce some difficulty in mixing technique and molding technique.

It may be stated that if the blended binder of the composition exceeds a penetration of 30 at 150° F., 5 seconds, 100 grams, it would not be practical to make a suitable composition for my purpose with any feasible amounts of mineral matter and fiber. Also, while some increased resistance to acid might be evident with less than 1½% of resin to 98½% asphalt in the asphaltic blend, yet it may not be sufficient to make the effort worth while. The high limit of any selected resin suitable for my purpose would be one which would not bring the final penetration of the asphaltic blend to above the figure of 30 under the above recited conditions. I have not been able with any combination to attain sufficient stiffness with more than 30% of the suitable resin with relation to the whole blended binder, which would be 15% resin in a composition that was one half binder. I do not wish to be limited to this figure, but give it as an indication of the probable top value taking all of the factors into consideration. A good working range is from 2 to 15% of resin based on the total composition.

The resin must be one which in the completed product will polymerize in the presence of storage battery acid with a fair degree of rapidity at room temperature. It must, in other words, be an active, acid polymerizable resin. A barrier should be formed at battery operating temperature within a week or two, to give desirable protection. The resin must be highly inert to attack by storage battery acid or like acid after polymerization by the acid. It is desirable to select a resin which can be finished off prior to incorporation in the composition with a controlled degree of polymerization. Thus with a resin which will polymerize completely over a period of a very short time, under the conditions to which it is subjected prior to use in the composition, cooling or other technique must be adopted to stop the polymerization at the required point. For example, the furfuryl alcohol resins behave under acid polymerization with a predictable and gradual change, and thus are desirable from a processing point of view, although in cost they exceed other resins such as phenolaldehyde resins.

Resins which require a long heating period to polymerize in the presence of acid, where the heat required is above say 150° F., will not serve because the barrier would not be formed in the normal service of the storage battery case. Urea and melamine resins are not sufficiently resistant to acid and styrene and vinyl resins do not polymerize satisfactorily to form the acid barrier, since peroxide type catalysts are needed to polymerize them.

I will give several examples of resins, but the composition which is basically my invention does not involve a particular resin although certain ones possess decided advantages. Thus the reciting of resins which have worked satisfactorily in a long investigation of the subject, should not be taken as a limitation because one would be rash in the present stage of development of synthetic resins to predict the future.

Resins which, in part at least, include the furane ring, seem to blend best with asphaltic binders. Furfuryl-alcohol itself without any initial polymerization may be used, but although there may be some polymerization of the alcohol incident to the heat and working of the mixing operation, it will be generally the case that the ultimate stiffness of the binder will be severely affected by the fluid alcohol. Also in the mixing operation which requires somewhat elevated temperature, some of the alcohol will be lost through evaporation, and since it is relatively costly, a reflux condenser is necessary when using the straight alcohol, and this does not protect the product during hot molding.

It is preferred that the furfuryl alcohol be polymerized prior to incorporation with the asphalt. The degree of polymerization is one which may approach, but does not reach the condition where the effectiveness thereof to form the barrier layer upon exposure to acid is lost. In factory operations it will be possible to control the state of polymerization fairly accurately.

As an example, a commercially pure furfuryl alcohol is mixed with 1 part of a water solution of phosphoric acid in proportions of around 8.5% solution to 100 parts of the alcohol. The temperature of the mixture is kept just under the boiling point of water, say as near 211° F. as possible, and refluxing is carried out for around 7 hours. At this point the resin will be in a condition similar to syrupy liquid.

As a measure of the condition of this resin its viscosity at room temperature (75° F.) will run in the proximity of 70,000 to 100,000 centipoises on the MacMichael viscosimeter, which is a preferred range. Proceeding in the same manner but using a longer reflux period, the resin becomes stiffer but is usable up to a point where it becomes semi-solid and has a penetration in the neighborhood of 1.1 at 32° F., 200 grams, 60 seconds. These higher viscosities are not as desirable.

It is practical to use any degree of polymerization short of this condition; but if the resin is brought to a penetration at room temperature of .5, under the above conditions, or lower, the condition of forming an acid barrier will not develop in the molded product. The percentages and times given above are for a commercial size batch, since laboratory size batches require more catalyst.

Depending upon the hardness of the resin, the asphaltic binder will be controlled in hardness so that the ultimate hardness of the blended binder will be within the limits given above.

Another resin which may be used is phenol formaldehyde resin compounded as for a molding resin. Giving laboratory size amounts which will govern as to proportions, 188 grams of phenol is mixed with 135 grams of formaldehyde and to this is added .6 gram of concentrated sulphuric acid and 20 grams (cc.) of water. The mixture is heated to about the boiling point of water and refluxed for about an hour, whereupon a heavy, molasses-like resin is produced. It is required that the conditions be observed, and the moment the given condition is reached, the polymerization should be stopped as by chilling, for example.

The heat susceptibility of this resin is great and resins of a penetration of .4 at 60 seconds, 200 grams, 32° F., have proved fairly satisfactory. When the heat susceptibility begins to decrease rapidly, such as phenol-formaldehyde resin has progressed too far in polymerization to make a barrier.

Mixtures of some of this phenol-formaldehyde resin and the furfuryl alcohol resin in the desired stage of prepolymerization can be employed.

A phenol furfural resin has been employed. Thus we have used 94 parts by weight of phenol to 144 parts of furfural and 2.4 parts of NaOH in 12 parts of water. At near boiling point of water, and refluxing for four hours, a syrupy condition is obtained, and the resin although formed by catalytic action with an alkali is one which will be thrown over to fully polymerized condition by the use of storage battery acid to make an excellent barrier, although not so rapidly as furfuryl alcohol resin in the absence of heat.

The above resins blend with asphalt, will polymerize below 150° F. in the presence of storage battery acid, and will be highly resistant to acid when fully polymerized.

It will be noted in this example there is an excess of furfural to phenol. These proportions can be varied, but the results start to fall off at equal parts of the two.

The viscosity of this particular resin, when added to the binder has proved most satisfactory at 500 to 700 centipoises on the MacMichael viscosimeter at 75° F. since it has heat polymerizing characteristics as already discussed. A prepolymerization to a penetration lower than 1.5, 32° F., 60 seconds, 200 grams would not form an adequate barrier according to my experience.

It is preferable not to attempt to bring about the partial polymerization of the resin used in situ in the asphaltic binder, because the control is much more difficult, which is not to say that it would be impractical. It is desirable to avoid the use of much acid in the binder, because this may affect the entire fiber constituent of the final composition. Thus with the furfuryl alcohol resin, it is preferable to neutralize the acid catalyst used before blending with the asphalt.

The operation of making the mixture can be varied as well as the temperature of molding. My experience with these operations indicates that at no point will the composition be required to withstand a temperature of above, say, 350° F. One technique of mixing consists of incorporating the mineral matter and fiber during a single mixing stage, in the presence of water initially present, but which at the later stage of mixing disappears. The temperature in the mixer does not rise above around 300 to 325° F. at the end of the operation. Another technique is to make a preliminary mix in the standard mixer and then run the material through an extrusion mixer, such as a Watson mixer, which operates by forcing the material from a heated chamber through a restricted orifice. It is practical to introduce the resin along with the fiber, or it may be added at any stage of the mixing if a good blend is obtained. One technique is to blend the resin and the asphalt at around 250° F. in the mixer, then add the mineral matter and mix it into the binder, and finally introduce the fiber together with some water, and continue to mix to fully distribute and coat the fiber. All of these techniques aside from the incorporation step for the resin can be the usual ones employed in making composition for storage battery cases. The molding will also be the same and consists in pressure molding of the hot "dough" into one piece cases with unitary partitions, using a suitable die and a heavy duty press.

It may be noted that in view of the temperatures it is necessary for economy's sake to polymerize the resin used to an extent where it will not vaporize substantially at the temperatures employed at any point, the highest temperature usually being just prior to molding.

It is not necessary to use water in the mixing operation in so far as the behavior of the resin is concerned, and with fiber which can withstand high temperatures it would be practical to use temperatures up to 350° F. throughout the entire mixing operation.

It has been found that the presence of the resin makes the molding operation more perfect since it to some extent acts as a plasticizer for the mass.

If knit lines develop in the product to some extent the behavior of the binder is such that when acid penetrates into the microscopic cracks at the knit lines, it soon builds up a dam or barrier on the walls of the knit line of cleavage.

With the furfuryl alcohol resin the behavior can be visually noted after exposure to the acid of storage battery strength. Thus a molded surface which is shiny and very smooth will develop a velvety mat after short exposure to battery acid of strength 1.3 specific gravity. The normal acid strength for storage batteries is 1.3 spec. gravity but 1.1 spec. gravity is often used in forming the plates initially. When plates are formed after being placed in the battery box, some techniques call for using 1.1 acid and the forming takes several days. This period of time is not enough to permit any great degree of penetration and the weaker acid is then poured out and the normal 1.3 strength placed therein. Thus when speaking of exposure to battery acid what is meant is exposure to 1.3 strength sulphuric acid according to present practice.

Factory runs of storage battery composition cases made according to my invention will show no calculable penetration of acid after exposure at 120° F. for 30 days to battery acid. This depth of penetration is measured by breaking open the test bar and measuring the depth of the zone in which the fiber has been destroyed. The resistance of the partitions of the cases will measure 250,000 ohms and above, both transverse and along the surface and continue during the 30 day test exposure to give a like reading. The absorption of acid as applied to test bars cut from the molded product after 30 days exposure to battery acid at 120° F. will not run to exceed 1.5%, which means that the test bar when washed with water and wiped dry will show a gain of this amount or less in weight. In plain water the absorption in this test is considerably greater.

A similar composition but with omission of the resin will show an acid penetration after 30 days at 120° F. of several 64ths of an inch, which is close to the danger point of penetrating all the way through a partition. The absorption test after 30 days exposure will run in such unresinified composition to 3% and often above that figure. These tests of the unresinified composition are on samples which have no knit lines. Also all tests of acid penetration were taken at the molded surface rather than at the edges of partitions or walls to obtain the best resulting figures, in the non-resinified composition.

The function of the barrier is difficult to explain because there is not enough of the resin to acid-protect the fibers, as has already been noted. Whether or not there is some migration of the resin to the surface upon exposure to battery acid is not known. At any rate, well within the required hardness of finished compounds it is possible to eliminate largely the major imperfections of standard composition cases of the past.

It remains to give some typical examples of operations which will show the acid barrier development, not all as effective as others, but within the range where my invention shows decided advantage over the standard composition battery case.

*Example 1*

Per cent
Asphaltic binder 294° F. ball and ring melt point—penetration 150°, 100 gm., 5 sec. of 13 _____ 45
Resin—furfuryl alcohol—polymerized to 92,000 centipoises 75° F. MacMichael_____ 4
Mineral matter—pyropholite talc_____ 40
Fiber—cotton linters_____ 11

Cotton with 75% water by weight and the resin were mixed in a warm mixer to uniform wetting of fiber (say, 15 min.). Asphalt and talc mixed to a paste in hot mixer. The treated cotton is added and hot mixed to a point where mixture is uniform. Then the mass is run through Watson mixer at 310–20° F. The extruded mass is then cut, weighed, and placed, while still hot, in molds, and there formed into one-piece storage battery cases.

*Example 2*

Per cent
Asphalt 18 pen. (same basis) 298° F., melt point (same basis)_____ 45
Resin—phenol furfural 1:1.5, polymerized to 600 centipoises at 75° F. MacMichael_____ 4
Mineral matter and fiber—same.

Paste formed of asphalt and mineral matter mixed to a paste, resin then added with mixing, finally the cotton fibers added with 50% of its weight in water. Finishing and molding—the same.

I have already stated the limits in viscosity of these two resins. The limits in percentages will be, say, from 1½ to 15% of the total mass; 3 to 6% is preferred. Limits in amount of total binder to fiber have already been stated. The upper limits of resin will apply where the upper limits of fiber are higher. For example, I could use with excellent result, taking Example 1, around 43 parts of asphaltic binder, 34 parts of mineral filler, 6 parts of resin, and 17 parts of cotton linters.

*Example 3*

Per cent
Asphaltic binder—298° F., 18 penetration____ 45
Resin phenol-formaldehyde (formed as above stated).
Viscosity 300,000, at 75° F. MacMichael_____ 4
Cotton linters and mineral matter, same as in Example 1.

Here the mineral filler, cotton, asphalt (molten), water, and resin are added in the mixer in the order named, mixed, and then put through the Watson as before.

Like variations to those described as to the other examples could apply here.

In the above specification I have referred throughout to storage battery cases. The uses of the invention are not necessarily limited to this one product.

Having thus described my invention, what I claim as new and desire to secure by Letters Patent is:

1. An acid resistant molded article formed from a composition comprising a binder of asphalt and a resin in amount substantially 35% to 65% by weight of said composition, and containing acid-resistant mineral matter and organic fiber of acid attackable nature which normally would result in acid penetration into said article, the said binder having a hardness which is substantially between 5 and 30 penetration at 150° F. in 5 seconds under a weight of 100 grams, said resin being readily polymerizable in the presence of storage battery acid at normal temperatures of use of the article, and when fully polymerized being acid resistant, said resin chosen from a class consisting of partially polymerized furfuryl alcohol, phenol-furfural, phenol-formaldehyde, and mixtures thereof, said resin being in an incompletely polymerized condition in said molded article, and constituting substantially 1½% to 30% by weight of the total binder, and said resin acting, upon contact of said molded article with acid, to form a barrier to resist acid penetration therein.

2. An acid resistant molded article as claimed in claim 1, wherein said organic fiber of acid attackable nature is cotton fiber.

3. A storage battery container having asphalt plus a resin as a binder, and filler which includes as a strengthening agent an organic fiber which would normally result in acid penetration of the surfaces of said container, together with acid-resistant mineral matter, said binder constituting substantially 35% to 65% of the container, the balance being said filler, said resin being polymerizable by storage battery acid at temperatures encountered in normal storage battery service to an acid resistant condition, the said total binder having a hardness which is substantially between 5 and 30 penetration at 150° F. in 5 seconds under a weight of 100 grams, the said resin chosen from a class consisting of partially polymerized furfuryl alcohol, phenol-furfural, phenol-formaldehyde, and mixtures thereof, said resin being in an incompletely polymerized condition in said storage battery case, being present in an amount substantially between 1½% and 30% of said total binder, and said resin acting, upon contact of said molded article with acid, to form a barrier to resist acid penetration therein.

4. A storage battery container as claimed in claim 3 wherein said organic fiber is cotton.

5. The article of claim 3 in which the major portion at least of the resin is furfuryl alcohol resin.

6. The article of claim 3 in which the major portion at least of the resin is phenol-furfural resin.

7. The article of claim 3 in which the major portion at least of the resin is phenol-furfural resin of around 1 mol. phenol to 1.5 mol. furfural.

8. The article of claim 3 in which the major portion at least of the resin is phenol-formaldehyde resin.

9. A storage battery container the composition of which comprises substantially 35% to 65% of binder, said binder consisting of asphalt and a resin polymerizable by storage battery acid at temperatures encountered in normal storage battery service to an acid resistant condition, the said total binder having a hardness which is substantially between 5 and 30 penetration at 150° F. in 5 seconds under a weight of 100 grams, the balance of said composition being filler materials including from substantially 5% to substantially 17% by weight of the composition of organic fiber of acid attackable nature, the remaining filler being acid resistant mineral matter, the said resin chosen from a class consisting of partially polymerized furfuryl alcohol, phenol-furfural, phenol-formaldehyde, and mixtures thereof, said resin being in an incompletely polymerized condition in said storage battery case, being present in an amount substantially between 1½% and 30% of said total binder, and said resin acting, upon contact of said storage battery container with acid, to form a barrier to retard acid penetration therein.

10. A storage battery container as claimed in claim 9 in which the major portion at least of said resin is partially polymerized furfuryl alcohol.

11. A storage battery container as claimed in claim 9 in which the major portion at least of said resin is phenol-formaldehyde resin.

12. A storage battery container as claimed in claim 9 in which the major portion at least of said resin is phenol-furfural resin.

13. A bituminous storage battery container having the property of forming, upon exposure of its walls to storage battery acid, at temperatures of normal storage battery use a detectable acid resistant barrier at a slight depth inwardly of the wall surfaces so exposed, said barrier retarding further penetration of acid into the wall, the composition of said container consisting of substantially 35% to 65% by weight of asphalt plus resin as a binder, filler material including cotton fiber of acid attackable nature in an amount substantially 5% to 17% of the total composition and including acid-resistant mineral matter, and said resin chosen from a class consisting of partially polymerized furfuryl alcohol, phenol-furfural, phenol-formaldehyde, and mixtures thereof, in an amount substantially 2% to 15% of the total composition, said binder having a hardness which is substantially between 5 and 30 penetration at 150° F. in 5 seconds under a weight of 100 grams.

14. A bituminous storage battery container which, following a period of exposure to storage battery acid, at normal temperatures of storage battery use has its walls which were exposed to the said acid characterized by a detectable acid resistant barrier formation extending to a slight depth inwardly of the exposed surfaces and retarding further acid penetration thereof, said container having a composition consisting of asphalt plus a resin as a binder, and filler which includes acid-resistant mineral matter and, as a strengthening agent, an organic fiber in an amount substantially 5% to 17% of the total composition which would normally result in acid penetration of the surfaces of said container, said binder constituting substantially 35% to 65% of the container, the balance being said filler, said resin being polymerizable by storage battery acid at temperatures encountered in normal storage battery service to an acid resistant condition, the said total binder having a hardness which is substantially between 5 and 30 penetration at 150° F. in 5 seconds under a weight of 100 grams, the said resin chosen from a class consisting of partially polymerized furfuryl alcohol, phenol-furfural, phenol-formaldehyde, and mixtures thereof, said resin being in an incompletely polymerized condition in said storage battery case, and being present in an amount substantially between 1½% and 30% of said total binder 15. A bituminous storage battery container having a binder of asphalt and a resin constituting substantially 35% to 65% by weight of the container, and having a hardness which is substantially between 5 and 30 penetration at 150° F. in 5 seconds under a weight of 100 grams, and filler including acid-resistant mineral matter and, as a strengthening ingredient distributed cotton fiber in quantity to give rise to acid penetration, said quantity being substantially 5% to 17% by weight of the container, said container being characterized by the presence throughout its mass of said resin chosen from the class consisting of partially polymerized furfuryl alcohol, phenol-furfural, phenol-formaldehyde, and mixtures thereof, and constituting substantially 1½% to 30% of the binder, said resin existing in two forms in said container, a form at and inwardly of acid exposed surfaces to a slight depth at a stage of polymerization forming a barrier resisting further penetration, and the remainder in a form characterized by a lesser stage of polymerization at which it is capable of forming such a barrier upon contact with storage battery acid at normal temperatures of storage battery use.

16. A process for increasing the resistance to acid attack and penetration of a molded article having asphalt as a binder and substantially 65% to 35% of filler material including acid-resistant mineral matter and substantially 5% to 17% by weight of the composition of organic fiber of acid attackable nature which comprises blending into the composition from which said article is made a resin chosen from a class consisting of partially polymerized furfuryl alcohol, phenol-furfural, phenol-formaldehyde, and mixtures thereof, said resin being in an amount substantially 1½% to 30% of the total binder, the asphalt and resin constituting substantially 35% to 65% of the weight of the composition, the said total binder having a hardness which is substantially between 5 and 30 penetration at 150° F. in 5 seconds under a weight of 100 grams, and molding an article from the composition while maintaining said resin in an incompletely polymerized condition, said resin being acid polymerizable by storage battery acid at normal temperatures of use of the article to an acid resistant state, whereby acid penetration in said article will be resisted by reason of the formation in situ of an acid barrier therein due to the catalyzing action of the attacking acid.

17. The process of claim 16 in which the composition is formed by mixing when said binder is in a heat softened condition, but in which at no time is the mixing temperature allowed to exceed substantially 300° to 350° F.

18. The process of claim 16 in which the composition is formed by mixing when said binder is in a heat softened condition, but in which at no time is the mixing temperature allowed to exceed substantially 300° to 350° F., and in which the mixing temperature is controlled throughout a substantial portion of the mixing time to lower than the stated highest temperature by the presence of water in the composition.

19. A process for increasing the resistance to acid attack and penetration of a molded article having asphalt as a binder and substantially 65% to 35% of filler material including acid-resistant mineral matter and substantially 5% to 17% by weight of the composition of organic fiber of acid attackable nature, which comprises blending into the composition from which said article is made a resin chosen from a class consisting of partially polymerized furfuryl alcohol, phenol-furfural, phenol-formaldehyde, and mixtures thereof, said resin being in an amount substantially 1½% to 30% of the total binder, said total binder constituting substantially 35% to 65% by weight of the composition, and having a hardness which is substantially between 5 and 30 penetration at 150° F. in 5 seconds under a weight of 100 grams, and molding an article from the composition while maintaining said resin in an incompletely polymerized condition, said resin being acid polymerizable by storage battery acid at normal temperatures of storage battery use to an acid resistant state, whereby acid penetration in said article will be resisted by reason of the formation in situ of an acid barrier therein due to the catalyzing action of the attacking acid, and subsequently subjecting a portion at least of the surfaces of the molded article to acid whereby to form said acid barrier.

20. A process of producing a storage battery container which comprises forming by mixing a composition consisting of asphalt as a binder and a filler material including acid-resistant mineral matter and substantially 5% to 17% by weight of the composition of organic fiber of acid attackable nature, under conditions of heat sufficient to soften said binder, in a closed mixer equipped with a reflux condenser, adding furfural alcohol in an amount substantially 2% to 15% of the total composition during the said mixing, and continuing the mixing under said reflux condenser to produce a polymerization of said furfuryl alcohol short of complete polymerization thereof, the asphalt and the partially polymerized furfuryl alcohol constituting substantially 35% to 65% by weight of the composition, and molding an article from the so treated composition while maintaining the said partially polymerized furfuryl alcohol in an incompletely polymerized condition.

21. The process claimed in claim 16 in which said resin is a furfuryl alcohol resin and including the step of forming said resin by prepolymerizing furfuryl alcohol to a viscosity of substantially 70,000 to 100,000 centipoises at 75° F., prior to its incorporation in the composition.

22. The process claimed in claim 16 wherein the said resin is a phenol-furfural resin, and including the step of prepolymerizing phenol and furfural to a viscosity of substantially 500 to 700 centipoises at 75° F. prior to the addition of the resin to the said composition.

EDWARD R. DILLEHAY.

REFERENCES CITED

The following references are of record in the file of this patent:

UNITED STATES PATENTS

| Number | Name | Date |
|---|---|---|
| 1,732,124 | Fawkes | Oct. 15, 1929 |
| 2,114,121 | Bender | Apr. 12, 1938 |
| 2,314,181 | Winterkorn | Mar. 16, 1943 |
| 2,337,337 | McCluer et al. | Dec. 21, 1943 |
| 2,366,049 | Payne et al. | Dec. 26, 1944 |